METHOD FOR INCREASING EFFICIENCY OF BACKWARD WAVE OSCILLATOR TUBES

Filed Nov. 29, 1957 3 Sheets-Sheet 1

INVENTORS
ALAN W. EDE
ROY A. PAANANEN
BY [signature]
ATTORNEY

INVENTORS
ALAN W. EDE
ROY A. PAANANEN
BY [signature]
ATTORNEY

Nov. 30, 1965 A. W. EDE ETAL 3,221,267

METHOD FOR INCREASING EFFICIENCY OF BACKWARD WAVE OSCILLATOR TUBES

Filed Nov. 29, 1957 3 Sheets-Sheet 3

INVENTORS
ALAN W. EDE
ROY A. PAANANEN
BY [signature]
ATTORNEY

United States Patent Office 3,221,267
Patented Nov. 30, 1965

3,221,267
METHOD FOR INCREASING EFFICIENCY OF BACKWARD WAVE OSCILLATOR TUBES

Alan W. Ede, Worcester, and Roy A. Paananen, Needham, Mass., assignors to Raytheon Company, a corporation of Delaware Filed Nov. 29, 1957, Ser. No. 700,258
6 Claims. (Cl. 331—44)

This invention relates to backward wave oscillator tubes of the type employing crossed electric and magnetic fields and more particularly pertains to a method for improving the efficiency of such tubes whereby a substantial increase in output power is obtained, and further pertains to an improved backward wave oscillator tube.

A backward wave oscillator tube is a type of traveling wave tube which depends for its operation upon the prolonged interaction of an electron beam with a component of an electromagnetic wave propagating along a delay line, the phase velocity of the interacting component having a direction opposite to the group velocity of the electromagnetic wave. In the backward wave oscillator tube of the type to which this invention relates, interaction between the electromagnetic wave and the electron beam takes place in a D.C. electric field having its lines of force transverse to the direction of beam travel and a constant magnetic field having its lines of force transverse to the direction of beam travel and at right angles to the D.C. electric field. Backward wave oscillator tubes employing such crossed electric and magnetic fields are sometimes referred to as "M" type tubes.

The invention, in essence, resides in causing localized magnetic distortions at suitable locations in a crossed field backward wave oscillator tube so that the magnetic field in the interaction space of the tube is locally shunted, tilted, or both, to cause an improved interaction of the electron beam with the R.F. field. Experiments on backward wave oscillators have shown that their power output may be materially increased and made more uniform over their operating range by suitable placement of ferromagnetic shims. In one instance the power output increase for crossed field backward wave oscillator tubes of a specific type averaged about 25 percent and for individual tubes an increase of as high as 300 percent was obtained. In a second instance, the power output increase for crossed field backward wave oscillator tubes of another type was even more striking, averaging about 300 percent.

The invention may be apprehended by reference to the following exposition when considered in conjunction with the drawings wherein.

Figure 1:
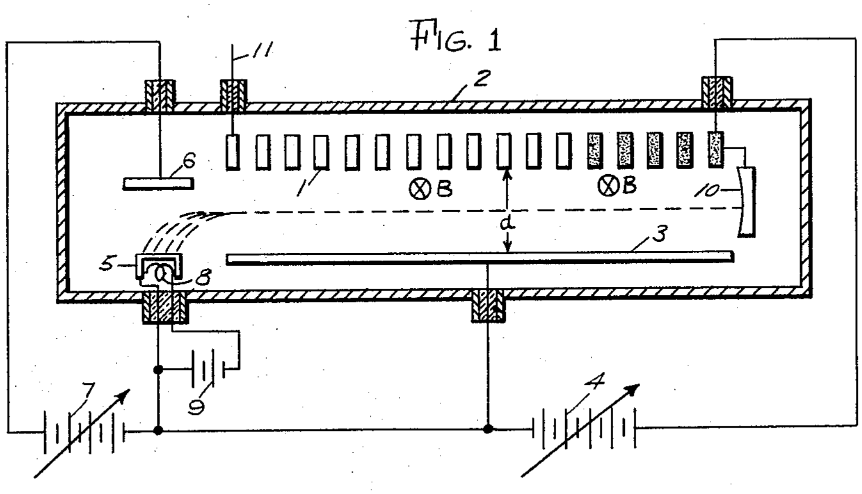
FIG. 1 is a schematic representation of a conventional rectilinear type crossed field backward wave oscillator tube.

Referring now to the conventional crossed field backward wave oscillator tube shown in schematic form in FIG. 1, a delay line 1, constructed so that its fundamental mode of wave propagation is a backward (or reverse) wave, is shown extending substantially throughout the entire length of the tube envelope. The tube envelope 2 is fabricated of a non-magnetic metallic material and is provided with insulative seals at various convenient locations through which electrical connections are made to elements housed in the envelope. The delay line 1 may be any wave propagating structure of the periodic filter type having suitable properties and is conventionally of the interdigital type, although one may substitute other configurations, such as a helix or ladder line. A planar electrode 3, known as the "sole" is positioned parallel to the delay line structure and spaced therefrom by a distance *d*. A variable voltage source, here indicated by battery 4, establishes an electric field E in the interaction space bounded by the delay line and sole, the latter being biased to a negative potential with respect to the delay line. A magnetic field B uniform throughout the interaction space is established by an convenient means (not shown), e.g. an electromagnet or permanent magnet. At one end of the tube there is positioned an electron gun symbolized by an electron emitting cathode 5 and an accelerating electrode 6 which is biased positively with respect to the cathode by battery 7. The cathode 5 encloses a heating element 8 which is connected to a suitable source of energy, such as battery 9. A collector electrode 10, which may be simply an extension of delay line 1, is situated at the end of the tube opposite from the electron source. The output of the oscillator tube is obtained from an output coupling 11 connected to delay line 1 adjacent the gun end of the tube. The terminal digits of the delay line at the collector end are stippled to indicate that attenuation has been provided in the line. The purpose of that attenuation is the absorption of wave energy to prevent reflection of waves from the collector end of the line. The attenuation may, for example, take the form of an iron coating adhering to the terminal digits or a lossy material inserted between the digits. The magnetic field B established in the interaction space is normal to the electric field E and in such direction that electrons are impelled by the crossed fields toward the collector 10. A beam of electrons is injected by the electron gun into the interaction space and the electrons travel at a velocity $V_e$ which is substantially equal to the phase velocity of a component of a wave propagating along the delay line, the group velocity of said wave being in the direction opposite to the direction of travel of the electron beam. When the current of the beam is increased above a critical value, oscillations commence at a frequency determined by the electron velocity $V_e$. $V_e$ is the average translational electron velocity and is equal to $E/B$. The continuous field E, between anode 1 and sole 3, is equal to $V/d$, where V is the voltage provided by source 4. It follows, therefore, as V is varied, the electron velocity varies, and the wavelength of oscillation varies accordingly. The major interaction between the electron beam and the R.F. field on the delay line occurs at the output end of the line and little or no interaction occurs at the attenuation end of the line. In between these ends the interaction between the beam and the R.F. field gradually decreases as the electrons approach the attenuation region. The presently held theory of operation of traveling wave oscillator tubes of the type described herein teaches that, for efficient interaction between the beam and R.F. field, the electrons of the beam must travel in the interaction space at a translational velocity which is synchronous with the phase velocity of a component of the traveling wave on the anode. Since the delay line is a reiterative structure and the line is constructed to have a uniform phase shift for each iterative section, the velocity $V_e$ of the electrons in the beam, which is a function of $E/B$, is maintained at a constant value throughout the interaction space; that is, in the conventional crossed field backward wave oscillator tube, the electric and magnetic fields are made as uniform as possible in the interaction region.

By introducing localized inhomogeneities in the magnetic field at various locations in the interaction space, it has been found that the efficiency of a backward wave oscillator is materially enhanced. This, at first, appears to be somewhat at variance with the theory of operation since that theory teaches the desirability of having a homogeneous magnetic field. The inhomogeneities may, for example, be caused by placing magnetically permeable material, such as thin plates of iron or steel, at various locations on the tube's periphery so that the local magnetic field is shunted. The magnetically permeable thin plates will hereinafter be referred to as magnetic shims. By suitable arrangement of the magnetic shims, a localized tilting of the magnetic field can also be produced. The use of magnetic shims has been found to be most effective on backward wave oscillator tubes having a low delay line impedance when operated with a high space charge density.

Figure 3:
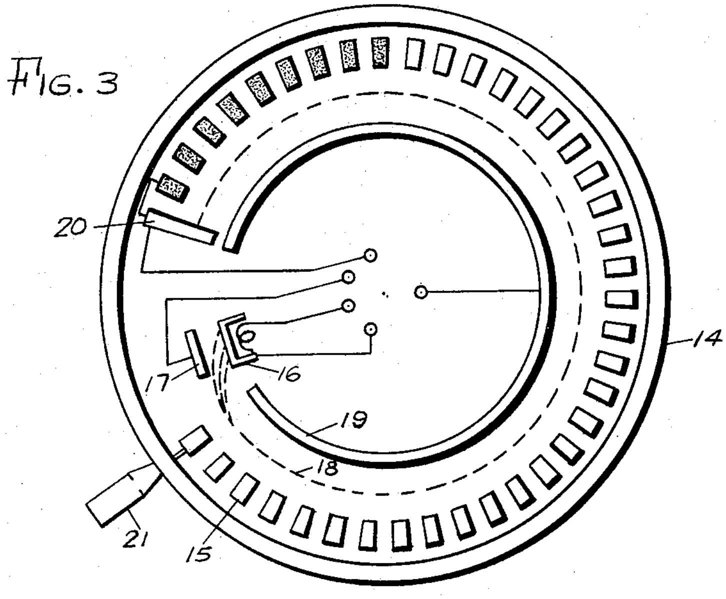
FIG. 3 is a schematic representation of a circular type crossed field backward wave oscillator tube.

The rectilinear cross field backward wave oscillator tube shown in FIG. 1 may be modified by employing a circular delay line and a concentric circular sole. FIG. 3 diagrammatically depicts the modified embodiment. In that figure a cylindrical annular casing 14 is shown enclosing a circular delay line 15 of the interdigital type. Cathode 16 and accelerating electrode 17 provide an electron beam 18, which traverses the interaction space bounded by the sole 19 and the delay line, and is absorbed by a collector electrode 20. The collector electrode is a thick metallic block capable of quickly dissipating heat. The collector may be simply an extension of delay line 15 or it may be an independent structure maintained at an electric potential close to that of the delay line. The output from the tube is obtained from the end of the delay line adjacent the electron gun by means of a vacuum tight coupling 21 which extends laterally through the casing 14. Except for the output coupling, all electrical connections to the internal elements of the tube are made by bringing the connecting leads to the center of the tube and thence upwardly or downwardly through one of the two cover plates, which together with the annular casing 14 form an evacuated cylindrical housing. Where the tube of FIG. 1 is bent to form a circle, it will, in all essential respects, be identical with the circular tube of FIG. 3.

Figure 4:
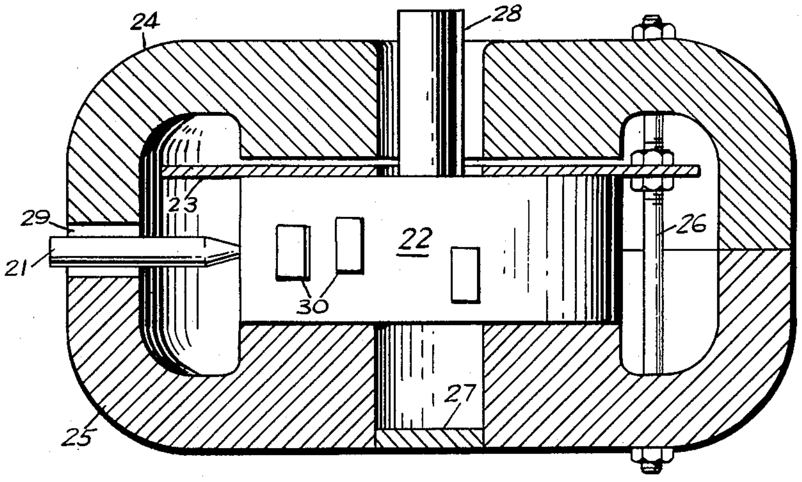
FIG. 4 depicts a circular backward wave oscillator tube with a permanent magnet assembled about the tube.

A circular oscillator tube, when completely assembled, is usually encased within a permanent magnet which completely encloses the tube, apertures being provided in the magnet through which project the necessary electrical connections. FIG. 4 illustrates a circular oscillator tube 22 encased in a permanent magnet, the magnet being shown in section in the figure so that its interior is visible. Affixed to the upper cover plate of the tube is a circular plate 23 which extends beyond the periphery of the tube. The permanent magnet is formed in two halves 24, 25 which are held together in any convenient manner, such as by bolts 26. The circular plate 23 is clamped between two nuts which are threaded on each bolt whereby the tube is prevented from shifting its position within the magnet. Each of the magnet halves has a central aperture, the central aperture of the lower half 25 being sealed by a metallic disc 27. The electrical connections which are brought out through the center of the tube 22 are connected to a socket which is surrounded by a protective metallic cylinder 28 extending through the central aperture in the upper magnet half 24. The laterally projecting output coupling 21 extends through an aperture 29 in the magnet.

Figure 5:
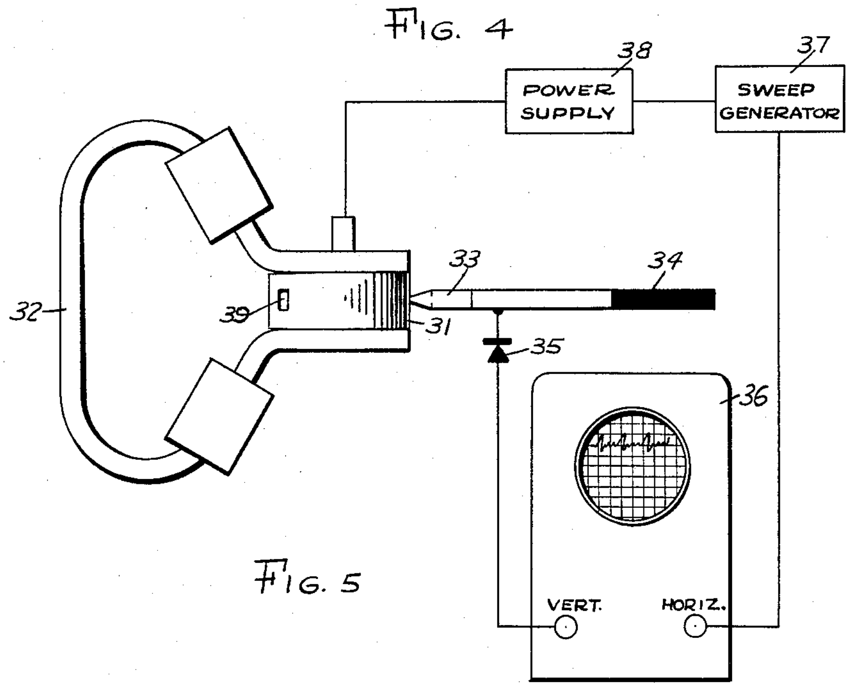
FIG. 5 is a diagrammatic showing of an apparatus arrangement useful in the practice of the invention.

FIG. 5 illustrates in schematic form an arrangement for rapidly determining the most effective placement of magnetic shims to increase the efficiency of a backward wave oscillator tube. The tube 31 is positioned between the pole pieces of an electromagnet 32 which establishes a uniform magnetic field in the tube. One of the pole pieces has a central aperture to accommodate the electrical connections brought out through the center of the tube. The output coupling 33 of the oscillator tube is connected to a matched load 34 whereby the tube may be operated substantially in the absence of reflected wave energy. A crystal detector 35, or any suitable microwave detector device, is connected between the output of the tube and the vertical input terminals of an oscilloscope 36. The anode voltage of oscillator tube 31 is modulated by a sweep generator 37 which is connected to the anode power supply 38. The anode voltage may be modulated at any suitable rate, and 60 cycles/sec. has been found to be convenient. By modulation of the anode voltage, tube 31 is caused to cyclically tune across a band of frequencies. Sweep generator 37 is also connected to the horizontal input terminals of the oscilloscope so that a correlation is obtained between the position of the oscilloscope trace and the frequencies generated by the tube. By this arrangement there is caused to be displayed on the face of the oscilloscope display tube an indication of the output power at each generated frequency for the entire tuned band. A magnetically permeable shim 39 is moved about the periphery of tube 31 until an increase in output power is indicated on the oscilloscope. Shims of various sizes and thicknesses are now substituted and the shim which is most effective is left in place. Experience has shown that shim sizes of about 1″ long, ½″ wide and thickness varying between .015″ and .075″ are most effective. Such shims are usually cut as sectors of a circle to permit matching the shim contour to the periphery of the tube. Another shim is then moved about the tube's periphery to ascertain whether a further increase in power output can be obtained. This process is repeated with additional shims until no further increase in power in any portion of the frequency band is obtained. The shims are subsequently permanently secured in place with any suitable adhesive and permanent magnets are assembled about the tube. Referring to FIG. 4, magnetic shims 30 are shown affixed to the periphery of tube 22. When the tube is encased within the permanent magnet, the shims are inaccessible and hence protected from inadvertent removal or displacement.

Several tentative explanations have been advanced to account for the effect of magnetic shims upon the efficiency of crossed field backward wave oscillator tubes, One such explanation holds that the distortions in the magnetic field introduced by the magnetic shims inhibit the growth of diocotron waves. Diocotron waves, also known as space charge waves, originate in random disturbances in the electron beam which have a tendency to grow as the beam travels in the interaction space. The presence of such waves at the normal tube operating current leads to scattering of electrons in the beam and ultimately to beam chaos, an effect oposed to the desired condition of electron bunching in the beam. The effect of diocotron waves is to make some of the energy in the beam unavailable for transfer to the R.F. field of the delay line and hence impairs the efficiency of the oscillator tube. By eliminating or reducing diocotron waves, it is apparent that more energy will be available in the beam, and thereby an increased interchange of energy can be obtained between the beam and the R.F. field.

Another tentative explanation holds that the shims correct for inaccuracies in the manufacture of the tubes. For example, to accord with the presently accepted theory of operation of traveling wave tubes, the distance $d$ between the delay line and sole must be constant throughout the interaction space in order for the electron beam to interact favorably over an appreciable length of the tube with the electromagnetic propagating on the delay line; that is, to promote prolonged favorable interaction between the electron beam and the wave energy traveling along the delay line, the electrons must remain in synchronism with the component of that wave energy. Now, if the sole is spaced with respect to the delay line so that the distance $d$ is not constant throughout the interaction region, the electrons in the beam tend to slip out of synchronism with the desired component of the propagating wave. Since the average translational velocity $V_e$ of the electrons is equal to $E/B$ and $E=V/d$, it can be appreciated that where $d$ is not constant, the electric field E will not be uniform in the interaction space, the $E/B$ ratio will vary, and hence the translational velocity Ve will vary. By shunting the magnetic field at appropriate locations where the electrons tend to slip out of sychronism due to an increase in *d*, the magnetic field is weakened locally whereby the *E/B* ratio is restored, causing the electrons to assume the correct synchronous velocity.

Figure 2:
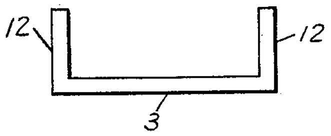
FIG. 2 is an end view of a sole electrode showing the end shields.

As can be seen in FIG. 2, which is an end view of a sole as actually constructed, end shields 12 are provided on the sole 3 to prevent lateral scattering of the electron beam. There is some evidence to indicate that, where the beam tends to depart from a centered position and strike the end shields, the placement of shims may locally distort the magnetic field in such manner as to restore the beam to its centered position. Experimental data indicates that the amount of current flowing to the sole can be decreased by apropriate shim placement; hence, it follows that a lesser number of electrons in the beam are absorbed by the sole. This experimental data is not conclusive, however, in establishing that the beam is caused to be centered inasmuch as the decrease in sole current can be attributed with equal logic to other possible effects on the beam.

Those persons familiar with backward wave oscillator tubes of the type described herein are cognizant that one of the outstanding attributes of such a tube is the ability of the tube to tune over an extremely wide frequency range. The theory of operation indicates that a backward wave oscillator tube is continuously tunable over a wide range and actual operation of such tubes has the validity of that theory. However, when a quantity of aparently similar backward wave oscillator tubes are constructed, certain of the tubes, for reasons which are not completely understood, exhibit frequency holes; that is some of the tubes may have distinct regions in the wide range in which oscillations are either very weak or cannot be produced. It has been found that by placing magnetic shims at appropriate locations on the tube's periphery, these frequency holes, in a number of instances, can be eliminated and the tube be made to tune continuously over the entire band. Moreover, where the instantaneous power output of a backward wave oscillator tube is higher at some frequencies than at others, the power output can be made more uniform over the tunable range by employment of magnetic shims. It is, at once, obvious that in some way, not wholly apprehended at this time, the local magnetic field distortions introduced by the shims cause an alteration in certain properties of the electron beam to bring about the effects previously noted.

Figure 6:
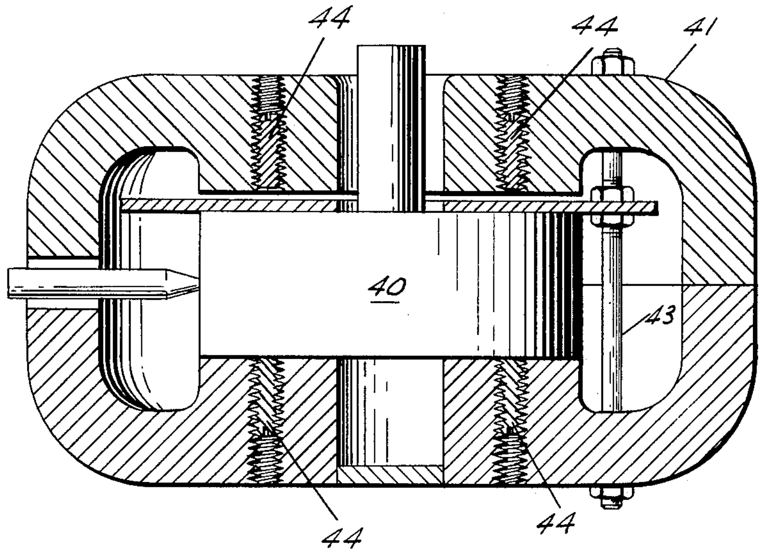
FIG. 6 illustrates an alternative embodiment of the invention employing movable magnetic plugs.

The invention has thus far been described with reference to the preferred embodiment which utilizes magnetic shims. It is aparent, however, that other means may be employed to cause the desired distortions of the magnetic field in the interaction space. For example, the magnetic pole pieces between which the magnetic field is established may be provided with a plurality of threaded magnetic plugs which can be moved toward or away from the oposite pole to alter the magnetic field strength at particular locations. FIG. 6 illustrates a circular oscillator tube 40 encased in a permanent magnet having such plugs, the magnet being shown in section in the figure. The permanent magnet is formed in two halves 41, 42 which are held together in any suitable manner, such as by bolts 43, and the tube is prevented from shifting its position within the magnet by the same means described in connection with FIG. 4. The upper and lower halves of the permanent magnet of FIG. 6 are each provided with a plurality of threaded magnetic plugs 44. By moving the plugs 44 toward or away from the tube, while the tube is being operated and its output observed on an oscilloscope in a manner similar to that shown in FIG. 5, the magnetic field may be caused to be locally distorted in such fashion as to enhance the efficiency of the tube. After being appropriately postioned, the threaded plugs may be locked in position by any suitable means to insure that the plugs will retain their correct positions when subjected to conditions where mechanical vibrations are encountered. The use of threaded plugs in the magnetic pole pieces does not permit the great flexibility of adjustment which is attained by the magnetic shims previously described, and therefore the latter are preferred.

While there has been described several embodiments of the invention, it will be obvious to those skilled in the art that various changes may be made therein without departing from the scope of the invention as set forth in the appended claims.

What is claimed is:

1. A method for improving the performance of a microwave oscillator tube of the type employing crossed electric and magnetic fields produced within an envelope in an interaction space disposed within the gap of a magnet and wherein the electron beam interacts with a component of an electromagnetic wave propagating along a delay line, and tube operating frequency is controlled by the ratio of strengths of said fields, comprising the steps of operating said tube to generate oscillatory electromagnetic energy, and selectively placing separate pieces of magnetically permeable material about the periphery of said tube envelope at locations within said magnet gap to thereby alter the magnetic strength in said interaction space adjacent thereto.

2. A method for improving the performance of a microwave oscillator tube of the type employing crossed electric and magnetic fields produced within an envelope in an interaction space disposed within the gap of a magnet and wherein the electron beam interacts with a component of an electromagnetic wave propagating along a delay line, and tube operating frequency is controlled by the ratio of strengths of said fields, comprising the steps of operating said tube to generate oscillatory electromagnetic energy, monitoring the power output of said tube, and selectively placing separate pieces of magnetically permeable material about the periphery of said tube envelope within said magnet gap to thereby alter the magnetic field strength in said interaction space adjacent thereto.

3. A method for increasing the efficiency of a microwave oscillator tube of the type employing crossed electric and magnetic fields produced within an envelope in an interaction space disposed within the gap of a magnet and wherein the electron beam interacts with a component of an electromagnetic wave propagating along a delay line, and tube operating frequency is controlled by the ratio of strengths of said fields, comprising the steps of operating said tube to generate oscillatory electromagnetic energy, tuning said tube to cause the generated oscillatory energy to sweep across a range of frequencies, monitoring the instantaneous power output of said tube, and selectively placing separate pieces of magnetically permeable shims at the periphery of said tube envelope within said magnet gap to thereby alter the magnetic field strength in said interaction space adjacent thereto.

4. A method for increasing the efficiency of a microwave oscillator tube of the type employing crossed electric and magnetic fields produced within an envelope in an interaction space disposed within the gap of a magnet and wherein the electron beam interacts with an electromagnetic wave propagating along a delay line in a direction opposite to the direction of travel of said electron beam, and tube operating frequency is controlled by the ratio of strengths of said fields, comprising the steps of operating said tube into a matched load to generate oscillatory electromagnetic energy, applying a modulating signal to said tube to tune said tube across a range of frequencies, monitoring the instantaneous power output of said tube to obtain a display of frequency versus instantaneous power output, and selectively positioning separate pieces of magnetically permeable shims at the periphery of said tube envelope within said magnet gap to thereby alter the magnetic field strength in said interaction space adjacent thereto.

5. A method for increasing the efficiency of a microwave oscillator tube of the type employing crossed electric and magnetic fields produced within an envelope in an interaction space disposed within the gap of a magnet and wherein the electron beam interacts with a component of an electromagnetic wave propagating along a delay line, and tube operating frequency is controlled by the ratio of strengths of said fields, comprising the steps of operating said tube with its output connected to a substantially reflectionless termination, applying a modulated voltage to said tube whereby to tune said tube across a range of frequencies, connecting a detecting device between the output of said tube and one of the deflection circuits of an oscilloscope, applying a sweep signal to said oscilloscope to obtain a display of frequency versus instantaneous power output, and selectively positioning separate pieces of magnetically permeable shims about the periphery of said oscillator tube envelope within said magnet gap to thereby alter the magnetic field strength in said interaction space adjacent thereto.

6. A crossed field type microwave tube of the type including a sealed envelope disposed in the gap between the poles of a magnet and wherein the envelope encloses an elongated delay line, an elongated electrode coextensive with the delay line defining an interaction space therebetween, and means generating a beam of electrons which are compelled to travel through the interaction space under control of said crossed electric and magnetic fields so that said electrons interact and exchange energy with waves conducted by said delay line, comprising means for adjusting the strength of said magnetic field in said interaction space including separate bodies of magnetically permeable material disposed at preselected points substantially contiguous with the outside of said envelope and within said gap.

References Cited by the Examiner

UNITED STATES PATENTS

| | | | |
|---|---|---|---|
| 2,455,676 | 12/1948 | Hillier | 313—84 |
| 2,533,687 | 12/1950 | Quam | 317—301 |
| 2,680,823 | 6/1954 | Dohler et al. | |
| 2,701,321 | 2/1955 | Ricy | 313—84 |
| 2,719,924 | 10/1955 | Oppenheimer et al. | |
| 2,730,648 | 1/1956 | Lerbs | 315—39.3 X |
| 2,791,718 | 5/1957 | Glass | 315—3.5 |
| 2,798,183 | 7/1957 | Sensiper | 315—3.5 |
| 2,807,743 | 9/1957 | Cioffi | 315—39.3 X |
| 2,809,328 | 10/1957 | Dench | 315—39.3 |
| 2,811,663 | 10/1957 | Brewer | 315—3.5 |
| 2,890,372 | 6/1959 | Dench | 315—3.5 |
| 2,942,141 | 6/1960 | Cutler | 315—153 X |
| 2,956,198 | 10/1960 | Elder et al. | 315—3.5 |

FOREIGN PATENTS

| | | |
|---|---|---|
| 441,740 | 1/1936 | Great Britain. |

OTHER REFERENCES

"Carcinotron" Backward Wave Microwave Oscillator: by Edward C. Dench Tele-Tech & Electronic Industries, November 1953, pp. 64–66, 157–162.

NATHAN KAUFMAN, *Primary Examiner.*

NORMAN H. EVANS, CHESTER L. JUSTUS, MAYNARD R. WILBUR, *Examiners.*